(12) United States Patent
Guo

(10) Patent No.: US 8,079,262 B2
(45) Date of Patent: Dec. 20, 2011

(54) PENDULOUS ACCELEROMETER WITH BALANCED GAS DAMPING

(75) Inventor: Shuwen Guo, Lakeville, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 402 days.

(21) Appl. No.: 11/978,090

(22) Filed: Oct. 26, 2007

(65) Prior Publication Data

US 2009/0107238 A1     Apr. 30, 2009

(51) Int. Cl.
*G01P 15/125* (2006.01)
(52) U.S. Cl. .................................. 73/514.32
(58) Field of Classification Search .............. 73/514.18, 73/514.24, 514.32, 514.38
See application file for complete search history.

(56) References Cited

U.S. PATENT DOCUMENTS

| | | | |
|---|---|---|---|
| 4,574,327 A | 3/1986 | Wilner | |
| 4,609,968 A | 9/1986 | Wilner | |
| 4,736,629 A | 4/1988 | Cole | |
| 4,825,335 A | 4/1989 | Wilner | |
| 4,999,735 A | 3/1991 | Wilner | |
| 5,205,171 A | 4/1993 | O'Brien et al. | |
| 5,220,835 A | 6/1993 | Stephan | |
| 5,367,429 A | 11/1994 | Tsuchitani et al. | |
| 5,404,749 A | 4/1995 | Spangler | |
| 5,454,266 A | 10/1995 | Chevroulet et al. | |
| 5,777,226 A | 7/1998 | Ip | |
| 5,900,550 A | 5/1999 | Menzel | |
| 6,230,567 B1 | 5/2001 | Greiff | |
| 6,531,332 B1 | 3/2003 | Shkel et al. | |
| 6,761,070 B2 | 7/2004 | Zarabadi et al. | |
| 6,841,992 B2 | 1/2005 | Yue et al. | |
| 6,854,330 B2 | 2/2005 | Potter | |
| 6,871,544 B1 | 3/2005 | Selvakumar et al. | |
| 6,912,902 B2 | 7/2005 | Malametz et al. | |
| 6,935,175 B2 | 8/2005 | Eskridge et al. | |

(Continued)

FOREIGN PATENT DOCUMENTS

WO     WO 2006/134232 A1     12/2006

OTHER PUBLICATIONS

Official Communication and Partial European Search Report issued Feb. 9, 2009.

(Continued)

*Primary Examiner* — John Chapman, Jr.
(74) *Attorney, Agent, or Firm* — Scott D. Wofsy; Edwards Wildman Palmer LLP

(57) ABSTRACT

A pendulous capacitive accelerometer including a substrate having a substantially planar upper surface with an electrode section, and a sensing plate having a central anchor portion supported on the upper surface of the substrate to define a hinge axis. The sensing plate includes a solid proof mass on a first side of the central anchor portion and a substantially hollow proof mass on a second side of the central anchor portion, providing for reduced overall chip size and balanced gas damping. The solid proof mass has a first lower surface with a first electrode element thereon, and the substantially hollow proof mass has a second lower surface with a second electrode element thereon. Both the solid proof mass and the hollow proof mass have the same capacitive sensing area. The sensing plate rotates about the hinge axis relative to the upper surface of the substrate in response to an acceleration.

18 Claims, 2 Drawing Sheets

U.S. PATENT DOCUMENTS

| | | | |
|---|---|---|---|
| 6,945,110 | B2 | 9/2005 | Selvakumar et al. |
| 7,022,543 | B2 | 4/2006 | Eskridge et al. |
| 7,140,250 | B2 | 11/2006 | Leonardson et al. |
| 7,426,863 | B2 * | 9/2008 | Kuisma ............ 73/514.32 |
| 2004/0055382 | A1 | 3/2004 | Samuels et al. |
| 2004/0221650 | A1 | 11/2004 | Lehtonen |
| 2005/0005698 | A1 | 1/2005 | McNeil |
| 2005/0109109 | A1 | 5/2005 | Eskridge |
| 2005/0268719 | A1 | 12/2005 | Malametz |
| 2006/0169043 | A1 | 8/2006 | McNeil |
| 2006/0185433 | A1 | 8/2006 | Leonardson et al. |
| 2006/0277997 | A1 | 12/2006 | Foster et al. |
| 2007/0034007 | A1 | 2/2007 | Acar |
| 2010/0005884 | A1 | 1/2010 | Weinberg et al. |

OTHER PUBLICATIONS

European Search Report dated May 8, 2009.

J. Chae, H. Kulah and K. Najafi, "An in-plane high sensitivity, low-noise micro-g silicon accelerometer," in *Proc. IEEE MEMS*, Jan. 2003, pp. 466-469.

N. Yazdi and K. Najafi, "An All-Silicon Single-Wafer Micro-G Accelerometer with a Combined Surface and Bulk Micromachining Process," *J. Microelectromech. Sys.*, vol. 9, No. 4, pp. 544-550, Dec. 2000.

L. Ristic, R. Gutteridge, J. Kung, D. Koury, B. Dunn, and H. Zunino, "A Capacitive Type Accelerometer with Self-Test Feature Based on a Double-Pinned Polysilicon Structure," *in Tech. Dig. 7th Int. Conf. Solid-State Sensors and Actuators (Transducers '93)*, Yokohama, Japan, Jun. 1993, pp. 810-812.

F. Rudolf, A. Jornod, and P. Bencze, "Silicon microaccelerometer," *in Tech Dig. 4th Int. Conf. Solid-State Sensors and Actuators (Transducers '87)*, Tokyo, Japan, Jun. 1987, pp. 395-398.

F. Rudolf, A. Jornod, J. Bergqvist, and H. Leuthold, "Precision Accelerometers with μg Resolution," *Sensors and Actuators*, vol. A21-A23, pp. 297-302, 1990.

W. Henrion, L. DiSanza, M. Ip, S. Terry, and H. Jerman, "Wide-dynamic range direct digital accelerometer," *in Tech Dig. Solid-State Sensors and Actuators Workshop*, Hilton Head Island, SC, Jun. 1990, pp. 153-157.

Y. deCoulon, T. Smith, J. Hermann, M. Chevroulet, and F. Rudolf, "Design and test of a precision servoaccelerometer with digital output," *in Tech. Dig, 7th Int. Conf. Solid-State Sensors and Actuators (Transducers '93)*, Yokohama, Japan, Jun. 1993, pp. 832-835.

K. Warren, "Navigation Grade Silicon Accelerometers with Sacrificially Etched SIMOX and BESOI Structure," *in Tech. Dig. Solid-State Sensors and Actuators Workshop*, Hilton Head Island SC, Jun. 1994, pp. 69-72.

T.V. Roszhart, H. Jerman, J. Drake, and C. deCotiis, "An Inertial-Grade Micromachined Vibrating Beam Accelerometer," *in Tech. Dig. 8th Int. Conf. Solid-State Sensors and Actuators (Transducers '95)*, Stockholm, Sweden, Jun. 1995, pp. 4-19-4-22.

C. Liu, A.M. Barzilai, J.K. Reynolds, A. Partridge, T.W. Kenny, J.D. Grade, and H.K. Rockstad, "Characterization of a High-Sensitivity Micromachined Tunneling Accelerometer with Micro-g Resolution" *J. Microelectromech. Sys.*, vol. 7, No. 2, Jun. 1998, pp. 235-244.

S.J. Sherman, W.K. Tsang, T.A. Core, R.S. Payne, D.E. Quinn, K.H. Chau, J.A. Farash, and S.K. Baum, "A Low-Cost Monolithic Accelerometer; Product/Technology Update," *in Tech. Dig. IEEE Electron Devices Meeting (IEDM '92)*, Dec. 1992, pp. 501-504.

L. Ristic, R. Gutteridge, B. Dunn, D. Mietus, and P. Bennett, "Surface Micromachined Polysilicon Accelerometer," in *5th Tech. Dig. Solid-State Sensor and Actuator Workshop*, Hilton Head Island, SC, Jun. 1992, pp. 118-121.

\* cited by examiner

PENDULOUS ACCELEROMETER WITH BALANCED GAS DAMPING

BACKGROUND OF THE INVENTION

1. Field of the Invention

The present invention relates to accelerometers and other force sensing devices, and more particularly to capacitive pendulous accelerometers for measuring acceleration of an object.

2. Description of Related Art

High performance accelerometers with near micro-gravity resolution, high sensitivity, high linearity, and low bias drift are needed for a wide variety of applications, especially aerospace applications such as inertial navigation systems, guidance systems, and air data measurement systems. The resolution of high-performance accelerometers has been limited by thermomechanical Brownian noise of the sensor, which is dictated by the damping coefficient and the mass of the structure, as well as by the readout electronics.

Fabrication technology plays a critical role in ensuring that large mass, large capacitance, and small damping are simultaneously obtained, and that micro-gravity resolution is achieved. Previously, a number of high performance silicon accelerometers have been reported. These devices utilize a large proof mass in conjunction with capacitive, resonant, or tunneling current sensing schemes to achieve high sensitivity. Among all these, silicon capacitive accelerometers have several advantages that make them very attractive for numerous applications ranging from low cost, large volume automotive accelerometers to high precision inertial grade micro-gravity devices. Silicon capacitive accelerometers have high sensitivity, good direct current response and noise performance, low drift, low temperature sensitivity, low power dissipation, and a simple structure.

Capacitive accelerometers are typically vertical and lateral structures. Some designs use a see-saw structure, with a proof mass such as a flat plate suspended by torsional beams. The structure is typically asymmetrically shaped so that one side has greater mass than the other, resulting in a center of mass that is offset from the axis of the torsion bars. When an acceleration force produces a moment about the torsion bar axis, the plate is free to rotate, constrained only by the spring constant of the torsion bars.

The sensitivity of these types of accelerometers is defined as the ratio of deflection to acceleration. The mass of the plate, the distance from the center of mass to the torsion bar axis, and the torsion bar stiffness determine sensitivity. To increase the offset of the center of mass, the plate structure is designed to have an asymmetric shape. For example, one side of the plate may have a width that is larger than the other side of the plate, or one side of the plate may have a greater length than the other side. However, increasing the center mass offset by the asymmetric shaping methods mentioned above may result in an increase in total mass of the plate, which leads to reduced resonant frequency and decreased sensitivity. Increasing the center mass offset by asymmetric shaping may also result in a sacrifice of some of the dynamic g-range, which is defined by the separation distance between a stationary sensing element and the pendulous acceleration sensing plate. Another method for increasing center mass offset involves lengthening a portion of the pendulous sensing plate. The center mass offset is proportional to the length of the extended portion of the plate. However, extending one side of the plate may lead to unbalanced gas damping, which results in performance degradation. Gas damping can be balanced by perforating portions of the extended plate. However, such perforations also reduce the center mass offset and so reduces the sensitivity. Additionally, extending one side of the plate may result in an increase of the overall chip size.

Other conventional structures have utilized a deeper gap underneath the extended plate portion to increase the maximum angle of rotation while maintaining balanced gas damping. Such a structure may increase the dynamic g-range to some extent. However, the extended portion of the plate increases the dimension of the overall chip size, leads to unbalanced gas damping, and reduces the resonant frequency of the rotational structure, which again results in a decrease in the performance of the accelerometer.

Accordingly, there is a need for a capacitive pendulous accelerometer that allows for the least overall chip size while maintaining balanced gas damping and high sensitivity.

SUMMARY OF THE INVENTION

Advantages of the present invention will be set forth in and become apparent from the description that follows. Additional advantages of the invention will be realized and attained by the systems particularly pointed out in the written description and claims, as well as from the appended drawings.

To achieve these and other advantages and in accordance with the purpose of the invention, as embodied herein, the invention includes a pendulous capacitive accelerometer.

The accelerometer provides a symmetric plate area having an asymmetric plate mass, which allows for the overall chip size to be reduced while maintaining balanced gas damping and high sensitivity. The accelerometer includes a substrate having a substantially planar upper surface and a sensing plate having a central anchor portion supported on the upper surface of the substrate to define a hinge axis. The sensing plate includes a solid proof mass on a first side of the central anchor portion and a substantially hollow proof mass on a second side of the central anchor portion. The solid proof mass has a first lower surface with a first electrode element thereon, and the substantially hollow proof mass has a second lower surface with a second electrode element thereon.

The sensing plate is mounted to rotate about the hinge axis relative to the upper surface of the substrate in response to an acceleration of the proof masses. A first electrode section positioned on the upper surface of the substrate beneath the solid proof mass interacts with the electrode element on the lower surface of the solid proof mass, and a second electrode section positioned on the upper surface of the substrate beneath the hollow proof mass interacts with the electrode element on the lower surface of the hollow proof mass.

In an embodiment of the invention, the pendulous accelerometer is adapted and configured to operate in an open-loop mode. In this instance, the accelerometer includes a substrate having a substantially planar upper surface, and a sensing plate having a central anchor portion supported on the upper surface of the substrate to define a hinge axis. The sensing plate defines a solid proof mass on a first side of the central anchor portion and a substantially hollow proof mass on a second side of the central anchor portion. The solid proof mass includes a first lower surface with a first electrode element thereon, and the substantially hollow proof mass includes a second lower surface with a second electrode element thereon. The sensing plate is mounted to rotate about the hinge axis relative to the upper surface of the substrate in response to an acceleration of the proof masses, and a first electrode section is positioned on the upper surface of the substrate beneath the solid proof mass to interact with the electrode element on the lower surface of the solid proof mass. A second electrode section is positioned on the upper surface of the substrate beneath the hollow proof mass and interacts with the electrode element on the lower surface of the hollow proof mass. When the accelerometer is stationary or moving at a constant velocity, the sensing plate is disposed in a reference position that is substantially parallel to the substrate. As the accelerometer is accelerated, the sensing plate is displaced from the reference position, and a differential capacitive output signal is produced that is proportional to the magnitude of the displacement of the sensing plate from the reference position.

In another embodiment, the pendulous accelerometer is adapted and configured to operate in a closed-loop mode. In this instance, the accelerometer includes a substrate having a substantially planar upper surface and a sensing plate having a central anchor portion supported on the upper surface of the substrate to define a hinge axis. The sensing plate defines a solid proof mass on a first side of the central anchor portion and a substantially hollow proof mass on a second side of the central anchor portion. The solid proof mass includes a first lower surface with a first electrode element thereon, and the substantially hollow proof mass includes a second lower surface with a second electrode element thereon. The sensing plate is mounted to rotate about the hinge axis relative to the upper surface of the substrate in response to an acceleration of the proof masses. A first electrode section positioned on the upper surface of the substrate beneath the solid proof mass interacts with the electrode element on the lower surface of the solid proof mass. The first electrode section includes a first sensing electrode and a first feedback electrode. A second electrode section is positioned on the upper surface of the substrate beneath the hollow proof mass to interact with the electrode element on the lower surface of the hollow proof mass. The second electrode section comprises a second sensing electrode and a second feedback electrode. The first and second feedback electrodes electrostatically balance the sensing plate to maintain the sensing plate in a reference position that is substantially parallel to the upper surface of the substrate. An electronic output signal is produced that is proportional to a force exerted by the feedback electrodes to maintain the sensing plate in the reference position.

It is to be understood by those having ordinary skill in the art that the foregoing general description and the following detailed description are exemplary and are intended to provide further explanation of the invention claimed. The accompanying drawings, which are incorporated in and constitute part of this specification, are included to illustrate and provide a further understanding of the method and system of the invention. Together with the description, the drawings serve to explain principles of the invention.

BRIEF DESCRIPTION OF THE DRAWINGS

So that those skilled in the art to which the subject invention pertains will readily understand how to make and use the pendulous accelerometer without undue experimentation, preferred embodiments thereof will be described in detail below with reference to the following figures.

DETAILED DESCRIPTION OF THE PREFERRED EMBODIMENTS

Reference will now be made in detail to the present preferred embodiments of a pendulous accelerometer, examples of which are illustrated in the accompanying drawings.

Figure 1:
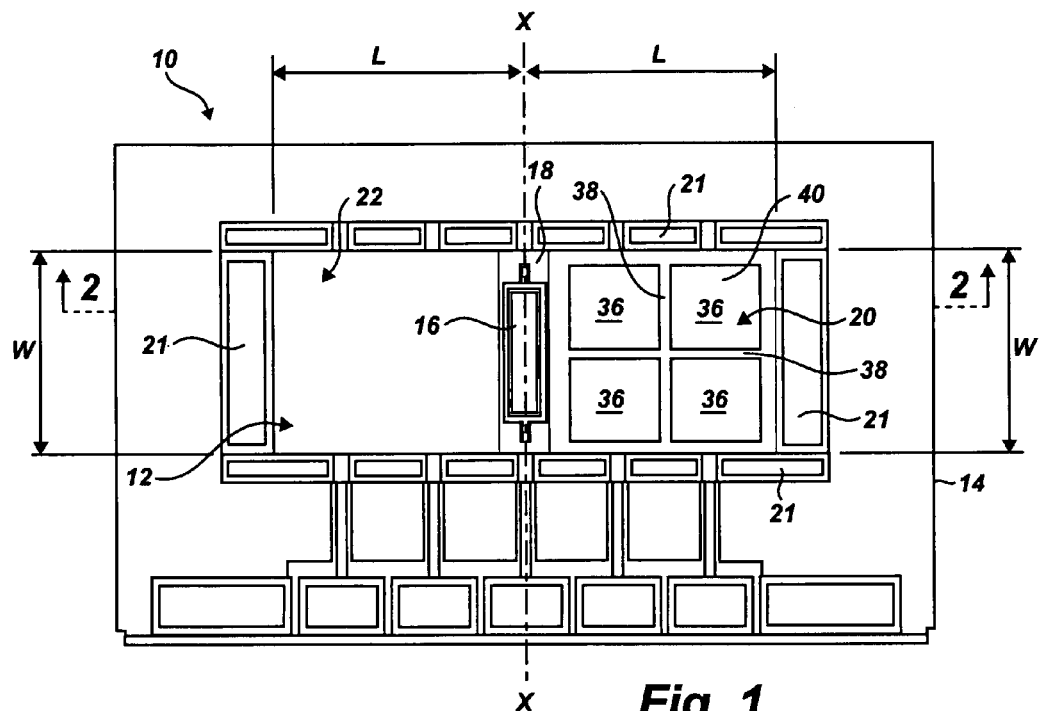
FIG. 1 is a top plan view of a pendulous accelerometer constructed in accordance with a preferred embodiment of the present invention.
Figure 2:
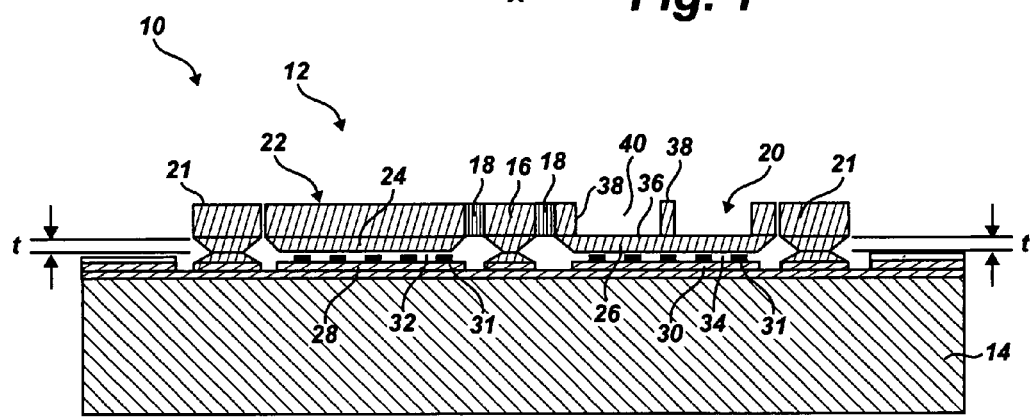
FIG. 2 is a cross-sectional view of the pendulous accelerometer of the subject invention, taken along line 2-2 of FIG. 1.

For purposes of explanation and illustration, and not limitation, a perspective view of an exemplary embodiment of the accelerometer is shown in FIGS. 1 and 2 and is designated generally by reference character 10.

Accelerometer 10 includes a sensing plate 12 and a substrate 14. Sensing plate 12 is attached to substrate 14 by one or more anchor portions 16 located near the center of the plate. Anchor portions 16 define a hinge axis x. Anchor portions 16 attach sensing plate 12 to substrate 14, allowing sensing plate 12 to rotate about hinge axis x.

In one exemplary embodiment, substrate 14 is made from a semiconductor such as silicon. In another exemplary embodiment, substrate 14 comprises a silicon on insulator (SOD) structure. Similarly, sensing plate 12 can also be made of a semiconductor such as silicon.

As shown in FIGS. 1 and 2, sensing plate 12 includes a substantially hollow proof mass 20, located on a first side of hinge axis x, and a solid side proof mass 22, located on a second side of hinge axis x. Torsion bars 18 connect solid side proof mass 22 and hollow side proof mass 20 to anchor portion 16. The mass of solid side proof mass 22 is greater than the mass of hollow side proof mass 20, allowing sensing plate 12 to rotate about hinge axis x when an acceleration is applied to accelerometer 10. Mechanical stops 21 can be formed on the top surface of substrate 14 around the outside of sensing plate 12 to protect torsion bar 18 from overstress under high shock conditions.

Sensing plate 12 also includes an electrode 24, located on a lower surface of solid side proof mass 22; and an electrode 26, located on a lower surface of the hollow side proof mass 20. In one exemplary embodiment, electrodes 24, 26 are integrally formed as part of sensing plate 12. In another exemplary embodiment, electrodes 24, 26 are separate elements located on the lower surfaces of solid side proof mass 22 and hollow side proof mass 20, respectively. Substrate 14 also includes electrodes 28, 30 positioned on a substantially planar top surface of substrate 14 and below electrodes 24, 26 respectively. A first gap 32 is formed between electrode 28 and 24, and a second gap 34 is formed between electrode 26 and 30. Accelerometer 10 thus functions as a parallel plate capacitor. When substrate 14 is accelerated, sensing plate 12 rotates about hinge axis x, which varies the size of gaps 32 and 34 and thus changes the capacitance. The change in capacitance is measured, allowing accelerometer 10 to convert the motion of sensing plate 12 into measurable electronic signals representing the acceleration of substrate 14. In one exemplary embodiment, a plurality of protrusions 31 extend upward from electrodes 28, 30 to prevent sensing plate 12 from striking and sticking to electrodes 28, 30 or substrate 14 when accelerometer 10 is overloaded. Protrusions 31 are preferably made of an oxide material, but other suitable materials may also be used. Protrusions 31 are preferably arranged in such a way as to prevent any portion of sensing plate 12 from impacting electrodes 28, 30 and substrate 14.

A gas such as air is trapped in gaps 32, 34 between sensing plate 12 and substrate 14. Because gaps 32, 34 are small, the gas damping effects are very sensitive to differences in the surface areas of electrodes 24, 26. In one exemplary embodiment, electrode 24 and electrode 26 have substantially the same surface area. Because electrodes 24 and 26 are equal in area, gas damping effects are balanced. Electrodes 24, 26 may also have substantially the same thickness t. In one exemplary embodiment, electrode 26 has a thickness between approximately 2.0 μm and approximately 15 μm.

In the embodiment shown in FIGS. 1 and 2, each half of sensing plate 12 is substantially the same size. That is, hollow side proof mass 20 and solid side proof mass 22 each have approximately the same length and width. Length is defined as the transverse length L of each side of sensing plate 12 as measured in a perpendicular direction from hinge axis x, as illustrated in FIG. 1. Width is defined as the width W measured in a direction parallel to hinge axis x, as illustrated in FIG. 1. In the exemplary embodiment shown in FIGS. 1 and 2, hollow side proof mass 20 includes a substantially planar floor portion 36, with sidewalls 38 extending upward from floor portion 36 to form one or more cavities 40. In this embodiment, sidewalls 38 include at least two walls that intersect at substantially right angles to form a plurality of rectangular cavities 40. In one exemplary embodiment, hollow side proof mass 20 includes four rectangular cavities 40 separated by sidewalls 38 that are substantially perpendicular to floor portion 36. Other shapes and sizes of cavities 40 are also within the scope of the invention. For example, cavities 40 may be rectangular, circular, or oval in shape. Sidewalls 38 may be formed at an angle to floor portion 36. In one exemplary embodiment, sidewalls 38 are formed at an angle of 54.7 degrees in relation to floor portion 36. In another exemplary embodiment, sidewalls 38 are formed at substantially right angles to floor portion 36. Hollow side proof mass 20 allows for a center of mass offset while maintaining equal surface areas on a bottom surface of each side of sensing plate 12, which allows for balanced gas damping. The center of mass offset can be adjusted by adjusting the thickness of sensing plate 12 and/or adjusting the depth of cavities 40. Sensing plate 12 is preferably between 25 μm and 300 μm thick. The thickness of a proof mass in a conventional accelerometer is typically about 10 μm. Increasing the thickness of sensing plate 12 allows for increased sensitivity of accelerometer 10.

Because the resonant frequency of sensing plate 12 having hollow side proof mass 20 is higher than that of a conventional proof mass, sensing plate 12 exhibits a higher resonant frequency than a conventional plate having the same dimensions, capacitance, and spring constant as sensing plate 12.

Accelerometer 10 can be configured to operate in either an open-loop mode or a closed-loop mode. In open-looped mode, the overall linearity, bandwidth, and dynamic range are limited by the sensor structure. However, open-loop operation of accelerometer 10 is inherently stable and allows for a simple interface circuitry. In open loop mode, sensing plate 12 rotates about hinge axis x relative to an upper surface of substrate 14. When substrate 14 is at rest or moving at a constant velocity, sensing plate 12 is in an equilibrium or reference position, where the bottom surface of sensing plate 12 is substantially parallel to the upper surface of substrate 14. When substrate 14 is accelerated, the center of mass offset of sensing plate 12 causes the sensing plate to be displaced from the equilibrium position, which causes a change in capacitance between the electrodes on sensing plate 12 and substrate 14. This change in capacitance can be measured and sent out as an electronic signal. In this way, an electronic output signal is produced that is proportional to the magnitude of the displacement of sensing plate 12.

Figure 3:
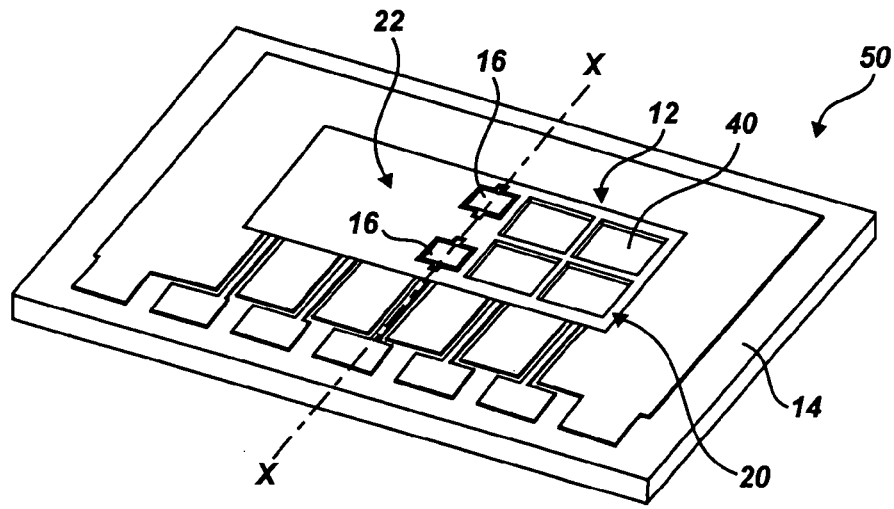
FIG. 3 is a perspective view of another representative embodiment of a pendulous accelerometer constructed in accordance with the present invention.
Figure 4:
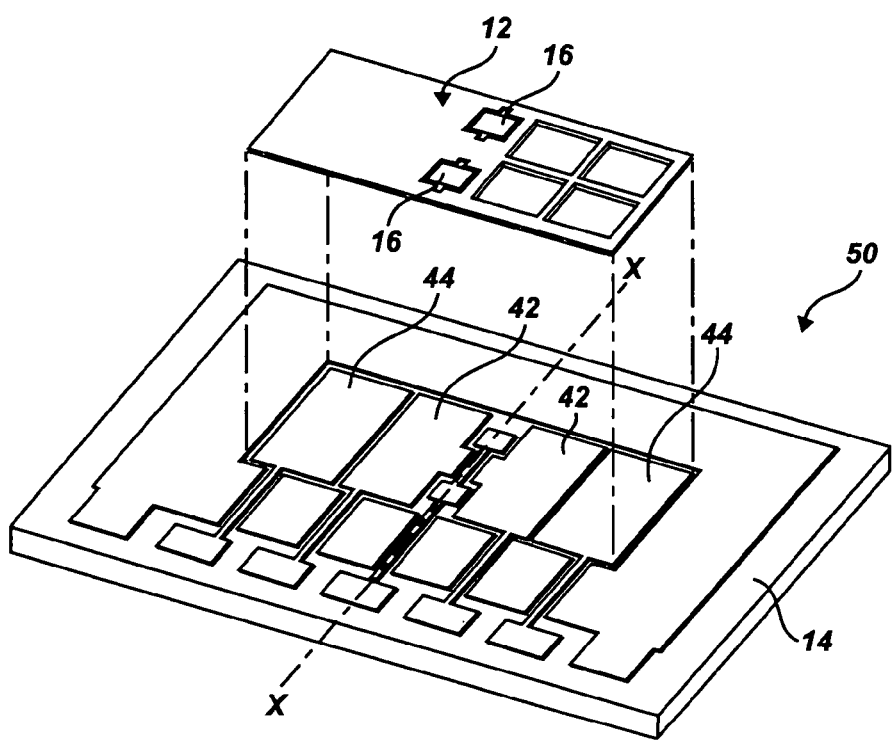
FIG. 4 is a perspective view of the pendulous accelerometer shown in FIG. 3 with the sensing plate separated from the substrate for ease of illustration.

Another exemplary embodiment of a pendulous accelerometer for operation in closed-loop mode is designated generally by reference character 50 as shown in FIGS. 3 and 4. This exemplary embodiment shares many features in common with the first exemplary embodiment; like reference numbers are used to refer to like features throughout the drawings. Pendulous accelerometer 50 includes sensing plate 12 with a plurality of anchor portions 16 attaching sensing plate 12 to a substrate 14. Electrodes on the upper surface of substrate 14 comprise sensing electrodes 42 and force feedback electrodes 44.

As shown in FIG. 4, a sensing electrode 42 is positioned on each side of hinge axis x. Sensing electrodes 42 operate as excitation electrodes to receive stimulating signals. A pair of feedback electrodes 44, with one feedback electrode 44 located on each side of hinge axis x, operate to electrostatically rebalance sensing element 12. In one exemplary embodiment, feedback electrodes 44 are located closer to hinge axis x than sensing electrodes 42. In another exemplary embodiment, feedback electrodes 44 may be located farther from hinge axis x than sensing electrodes 42. The latter configuration will maximize the available feedback force.

The pendulous accelerometer of the present invention, as described above and shown in the drawings, is a device having superior properties including balanced gas damping, high performance, high sensitivity, high linearity, and low bias drift. It will be apparent to those skilled in the art that various modifications and variations can be made to the device of the present invention without departing from the scope of the invention as described in the appended claims and their equivalents.

What is claimed is:

1. A pendulous accelerometer comprising:
  a) a substrate having a substantially planar upper surface;
  b) a sensing plate having a central anchor portion supported on the upper surface of the substrate to define a hinge axis, the sensing plate including a solid proof mass on a first side of the central anchor portion and a substantially hollow proof mass on a second side of the central anchor portion, the solid proof mass having a first lower surface with a first electrode element thereon, and the substantially hollow proof mass having a second lower surface with a second electrode element thereon, wherein the sensing plate is mounted to rotate about the hinge axis relative to the upper surface of the substrate in response to an acceleration of the proof masses, wherein the substantially hollow proof mass and the solid proof mass are connected to the central anchor portion by torsion bars, wherein the lower surface of the solid proof mass and the lower surface of the substantially hollow proof mass are coplanar with respective lower surfaces of the torsion bars, and wherein respective upper surfaces of the central anchor portion, the torsion bars, the hollow proof mass side and the solid proof mass side of the sensing plate are coplanar with one another;
  c) a first electrode section positioned on the upper surface of the substrate beneath the solid proof mass to interact with the electrode element on the lower surface of the solid proof mass; and
  d) a second electrode section positioned on the upper surface of the substrate beneath the hollow proof mass to interact with the electrode element on the lower surface of the hollow proof mass.

2. The pendulous accelerometer of claim 1, wherein the sensing plate has a thickness of between about 25 μm and about 300 μm.

3. The pendulous accelerometer of claim 1, wherein the substantially hollow proof mass includes a floor portion having a sidewall extending upward from the floor portion to form a cavity.

4. The pendulous accelerometer of claim 3, wherein the sidewalls include at least two walls that intersect at substantially right angles to form a plurality of cavities.

5. The pendulous accelerometer of claim 1, further comprising a plurality of protrusions extending upward from the first and second electrode sections.

6. The pendulous accelerometer of claim 1, wherein the first and second electrode elements cover approximately the same surface area on the respective lower surfaces of the proof masses.

7. The pendulous accelerometer of claim 6, wherein the width of the solid proof mass and the width of the substantially hollow proof mass are substantially equal.

8. The pendulous accelerometer of claim 1, wherein a transverse length of the solid proof mass is substantially equal to a transverse length of the substantially hollow proof mass.

9. The pendulous accelerometer of claim 1, wherein the width of the solid proof mass and the width of the substantially hollow proof mass are substantially equal.

10. The pendulous accelerometer of claim 1, wherein the central anchoring portion includes a plurality of anchors supporting the sensing plate on the substrate.

11. The pendulous accelerometer of claim 1, wherein the sensing plate rotates freely about the hinge axis.

12. The pendulous accelerometer of claim 1, wherein the sensing plate is maintained in a reference position that is substantially parallel to the upper surface of the substrate.

13. The pendulous accelerometer of claim 12, wherein the first electrode section includes a first sensing electrode and a first feedback electrode, and the second electrode section comprises a second sensing electrode and a second feedback electrode.

14. The pendulous accelerometer of claim 13, wherein the first and second feedback electrodes operate to electrostatically maintain the sensing plate in the reference position.

15. The pendulous accelerometer of claim 13, wherein the first and second feedback electrodes are positioned closer to the hinge axis than the first and second sensing electrodes.

16. A pendulous accelerometer for operating in an open-loop mode, the accelerometer comprising:
  a) a substrate having a substantially planar upper surface;
  b) a sensing plate having a central anchor portion supported on the upper surface of the substrate to define a hinge axis, the sensing plate defining a solid proof mass on a first side of the central anchor portion and a substantially hollow proof mass on a second side of the central anchor portion, the solid proof mass having a first lower surface with a first electrode element thereon, and the substantially hollow proof mass having a second lower surface with a second electrode element thereon, wherein the sensing plate is mounted to rotate about the hinge axis relative to the upper surface of the substrate in response to an acceleration of the proof masses, wherein the substantially hollow proof mass and the solid proof mass are connected to the central anchor portion by torsion bars, wherein the lower surface of the solid proof mass and the lower surface of the substantially hollow proof mass are coplanar with respective lower surfaces of the torsion bars, and wherein respective upper surfaces of the central anchor portion, the torsion bars, the hollow proof mass side and the solid proof mass side of the sensing plate are coplanar with one another;
  c) a first electrode section positioned on the upper surface of the substrate beneath the solid proof mass to interact with the electrode element on the lower surface of the solid proof mass; and
  d) a second electrode section positioned on the upper surface of the substrate beneath the hollow proof mass to interact with the electrode element on the lower surface of the hollow proof mass,
  e) wherein the sensing plate is displaced from a reference position, the sensing plate being substantially parallel to the substrate in the reference position, and
  f) wherein a differential capacitive output signal is produced that is proportional to the magnitude of the displacement of the sensing plate from the reference position.

17. The pendulous accelerometer of claim 16, wherein the first and second electrode sections include a sensing electrode.

18. A pendulous accelerometer for operating in a closed-loop mode, the accelerometer comprising:
  a) a substrate having a substantially planar upper surface;
  b) a sensing plate having a central anchor portion supported on the upper surface of the substrate to define a hinge axis, the sensing plate defining a solid proof mass on a first side of the central anchor portion and a substantially hollow proof mass on a second side of the central anchor portion, the solid proof mass having a first lower surface with a first electrode element thereon, and the substantially hollow proof mass having a second lower surface with a second electrode element thereon, wherein the sensing plate is mounted to rotate about the hinge axis relative to the upper surface of the substrate in response to an acceleration of the proof masses, wherein the substantially hollow proof mass and the solid proof mass are connected to the central anchor portion by torsion bars, wherein the lower surface of the solid proof mass and the lower surface of the substantially hollow proof mass are coplanar with respective lower surfaces of the torsion bars, and wherein respective upper surfaces of the central anchor portion, the torsion bars, the hollow proof mass side and the solid proof mass side of the sensing plate are coplanar with one another;
  c) a first electrode section positioned on the upper surface of the substrate beneath the solid proof mass to interact with the electrode element on the lower surface of the solid proof mass, wherein the first electrode section comprises a first sensing electrode and a first feedback electrode; and
  d) a second electrode section positioned on the upper surface of the substrate beneath the hollow proof mass to interact with the electrode element on the lower surface of the hollow proof mass wherein the second electrode section comprises a second sensing electrode and a second feedback electrode,
  e) wherein the first and second feedback electrodes electrostatically balance the sensing plate to maintain the sensing plate in a reference position that is substantially parallel to the upper surface of the substrate, and
  f) wherein an electronic output signal is produced that is proportional to a force exerted by the feedback electrodes to maintain the sensing plate in the reference position.

* * * * *